HEAT DISSIPATING DEVICE AND METHOD
Filed Dec. 16, 1965 2 Sheets-Sheet 1
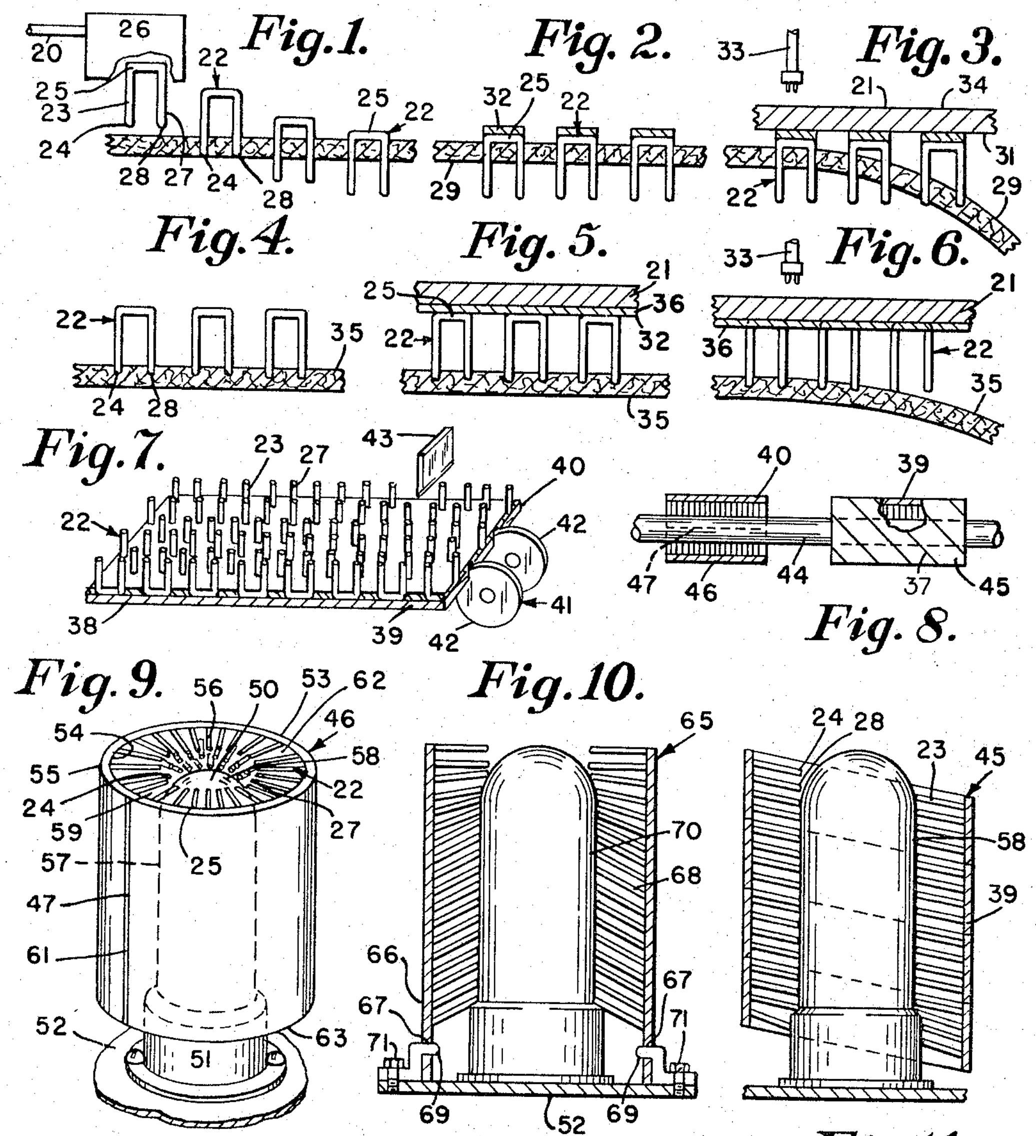
Fig. 1. Fig. 2. Fig. 3. Fig. 4. Fig. 5. Fig. 6. Fig. 7. Fig. 8. Fig. 9. Fig. 10.
Fig. 11.
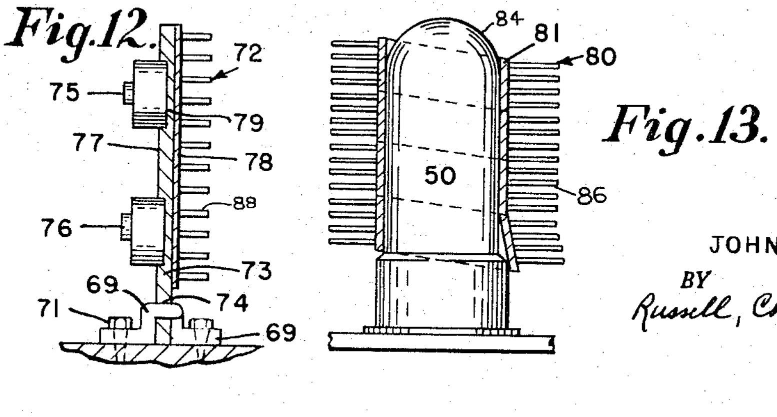
Fig. 12. Fig. 13.
INVENTOR.
JOHN H. JACOBY
BY
Russell, Chittick & Pfund
ATTORNEYS

HEAT DISSIPATING DEVICE AND METHOD

Filed Dec. 16, 1965 2 Sheets-Sheet 2

Inventor:
John H. Jacoby,
by Russell, Chittick & Pfund
Attorneys

United States Patent Office 3,327,779

Patented June 27, 1967

3,327,779

HEAT DISSIPATING DEVICE AND METHOD

John Hull Jacoby, 53 Bartlett St.,
Chelmsford, Mass. 01824

Filed Dec. 16, 1965, Ser. No. 514,410
5 Claims. (Cl. 165—185)

This is a continuation-in-part of Ser. No. 278,859, filed May 8, 1963, now abandoned. This invention relates to improved heat dissipating devices and to methods of making such devices and mounting them on heat producing bodies.

In the past, heat dissipators have been provided for conducting heat away from a heat source and for radiating that heat from roughened surfaces, from integral protuberances such as fins, rods, pins or flanges, or from lengths of conduit. However, space, size and weight limitations, as well as cost factors, have made it difficult to use such heat exchange elements in connection with electron tubes or transistors in electronic assemblies and the like.

Also, in the past, heat dissipators, usually finned, have been provided for mounting on steam or hot water piping to form convection radiators. These dissipators have usually been difficult to install, especially by a homeowner, and because they make less than total and uniform contact with the heat source, their radiating efficiency is less than optimum.

Accordingly, an object of this invention is to provide a heat dissipator for use with electronic components having a bristle-like or multiple pin surface which conducts heat efficiently, is compact, lightweight and relatively inexpensive to manufacture.

It is another object of this invention to provide a heat dissipator for use with heat producing electronic components which can be readily conformed to the shape of the components.

It is another object of this invention to provide a cylindrical heat dissipator having a deformable, resilient, inwardly extending pin surface for mounting around the exterior of an electron tube to create a shock mount or cushioning protective barrier for the tube as well as a heat transfer device.

It is another object of this invention to provide a heat dissipator having a flexible tape-like adhesive supporting surface which is adapted to be bonded to a heat source, and in particular to a steam or hot water pipe to form a convection radiator.

It is another object of this invention to provide a method for making the flexible, tape-like heat dissipator which method is simple, inexpensive, and rapid.

These and other objects of the invention will become more apparent as the description proceeds with the aid of the accompanying drawings in which:

FIGS. 1–3 are diagrammatic, sectional side elevations showing a method of making one embodiment of the heat dissipator of this invention;

FIGS. 4–6 are similar diagrammatic views showing another method of making said one embodiment of the heat dissipator of this invention;

FIG. 7 is a diagrammatic perspective view showing the slitting of a wide sheet of the heat dissipator made by either of the foregoing methods into narrower widths;

FIG. 8 is a diagrammatic side elevation, in section, showing the heat dissipator of FIG. 7 formed into cylindrical and helical configurations;

FIG. 9 is a perspective view of the heat dissipator of FIG. 7 in cylindrical form enclosing and supported by an electron tube;

FIG. 10 is a side elevation, partly in section, of a heat dissipator similar to that of FIG. 9 secured to a chassis and employed as a shock mount;

FIG. 11 is a side elevation, partly in section, of the heat dissipator of FIG. 7 in helical form enclosing and supported by an election tube;

FIG. 12 is a side elevation, partly in section, of a pair of transistors mounted on the heat dissipator of FIG. 7;

FIG. 13 is a side elevation, partly in section, of the heat dissipator of FIG. 7 in helical form enclosing and supported by an electron tube. This configuration is substantially the reverse of that shown in FIG. 11;

Figure 14:
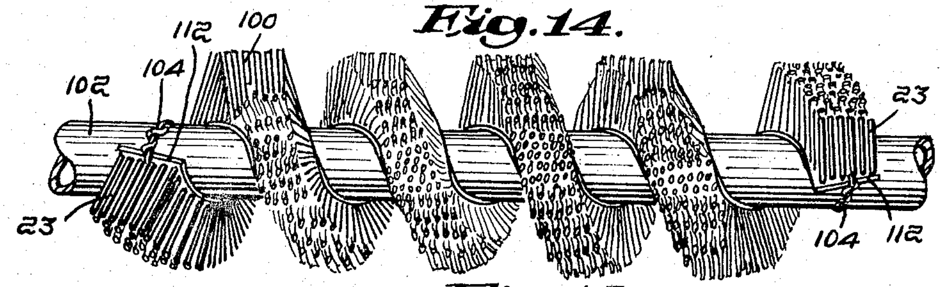
FIG. 14 is a perspective view of another embodiment of the heat dissipator of this invention having a flexible tape-like form which is wrapped around and secured to a length of piping.

Referring now to FIGS. 1–3 and FIGS. 4–6, two methods of making the heat dissipator embodiment of FIG. 7 are illustrated. A detailed description of these methods is contained in my co-pending application Ser. No. 510,423, filed Oct. 18, 1965, and the disclosure of that application is hereby adopted and made a part of this application.

Referring briefly to the method shown in FIGS. 1–3, it will be seen that one embodiment of the heat dissipator of this invention (shown in FIG. 7) is formed from a length of heat conductive metal wire 20 and heat conductive metal sheet 21. Preferably, the wire is copper or aluminum as is the sheet, these materials being readily deformable into desired shapes while still being self-supporting and resilient.

As shown in FIG. 1, the first step of the method is the forming of the heat conductive wire 20 into a plurality of identical U-shaped (or optionally T-shaped) wire elements 22, each having at least one pin-like body 23, pin tip 24, and pin base 25. The forming operation is accomplished by a forming apparatus 26.

A plurality of the wire elements 22 are then inserted into a retainer sheet 29 of paper or similar material so that pin base 25 seats flush against retainer sheet 29. Preferably, the wire elements are inserted in a pre-determined pattern covering the entire retainer sheet.

While the wire elements 22 are supported as shown in FIG. 2, a heat conductive bonding agent 32, preferably solder, is applied to the exposed pin bases 25. The metal backing sheet 21 (to which the bonding agent 32 may alternatively be applied) is then metallurgically bonded to the pin bases 25 by means of a heating element 33.

After bonding wire elements 22 to a metal sheet 21, the retainer sheet 29 is stripped off as indicated in FIG. 3. A heat dissipator is thus formed having a heat conducting path created from metal sheet 21 through bonding agent 32 through pin bases 25 and through pin bodies 23.

In FIGS. 4–6, a similar method is shown except that pin tips 24 of wire elements 22 are embedded in a retainer sheet 35 which is a low density material such as bubble-type polystyrene plastic. While wire elements 22 are so supported, a metal backing sheet 21 across which a layer 36 of heat conductive bonding agent 32, such as solder, is applied, is placed against the plurality of upstanding pin bases 25. A metallurgical bond is then accomplished by heating metal sheet 21 with a heating element 33 as shown in FIG. 6. Retainer sheet 35 is then stripped away.

It should be understood that the metallurgical bonding may be alternatively accomplished by brazing or by employing an epoxy resin adhesive having a substantial metal filler constituent. The important requirement is that the bond efficiently conduct heat between metal sheet 21 and wire elements 22.

FIG. 7 shows a completed heat disipator sheet 38 made by either of the processes shown in FIGS. 1–3 and FIGS. 4–6 undergoing a cutting or slitting operation to produce the desired size dissipator unit. For the slitting operation, a set of disc cutters 41 and/or a guillotine knife 43 can be employed.

It will be seen from FIG. 7 that the heat dissipator of this invention has a plurality of pin bodies 23 which are spaced apart laterally and longitudinally in a uniform pattern so that each pin body 23 is surrounded by air space into which heat can be efficiently dissipated. It will be understood that the heat disipator embodiment of FIG. 7 can be effectively mounted with respect to a heat source with either pin tips 24 in contact with the heat source or with metal sheet 21 in contact with the heat source. To illustrate this, compare FIG. 11 with FIG. 13.

When it is desired that the heat dissipator be used in connection with a cylindrical heat source, it can be formed on a mandrel 44 as shown in FIG. 8. For example, a dissipator 46 can be cut into a rectangular shape 40, wrapped around mandrel 44 and secured with a longitudinal seam 47, as by soldering. Alternatively, a dissipator 45 can be cut into an elongated narrow strip 39, helically wrapped around mandrel 44 and secured with a helical seam 37, as by soldering.

Heat dissipator 46 is shown in FIG. 9 mounted on a conventional electron discharge tube 50. The tube has a socket 51 which is affixed to a chassis 52 or other suitable support. Dssipator 46 includes a backing sheet 53 of heat conductive, thin, self supporting material, such as copper, having opposite faces 54 and 55. In this embodiment, the pin bases 25 of a plurality of pin elements 22 are metallurgically bonded to backing sheet face 54. A soldered seam 47 closes the cylindrical backing sheet 53. Pins 22 project radially inwardly with free pin tips 24 in contact with the exterior wall 57 of the electron tube envelope 58. The tube envelope 58 supportably mounts dissipator 46 by frictional contact with the multiplicity of pin tips 24. As shown in FIG. 9, the heat from tube 50 is conducted by pins 22 and substantially dissipated into the air space surrounding the pins within backing sheet 53. The remaining heat that reaches backing sheet 53 is dissipated from interior and exterior sheet faces 54 and 55. Convection causes the heated air to emerge from the upper open end 62 of dissipator 46 and draws cool air into the lower open end 63. Of course, the dissipator's performance can be further enhanced by causing a rapid airstream to flow past the pins.

Heat dissipator 45 is shown in FIG. 11 mounted on envelope 58 of an electron tube. The mounting and heat dissipation are accomplished in the same fashion as that of heat dissipator 46 shown in FIG. 9.

In FIG. 10 a heat dissipator 65 is shown, similar to dissipator 46 except that it is formed into a hollow cylinder on a mandrel 44 of less diameter than the diameter of the tube envelope on which it is to be mounted. Heat dissipator 65 also includes an integral margin or band 66 along one side thereof having a row of perforations 67 therealong some for use in anchoring the dissipator to a chassis and the others for convection air circulation. When dissipator 65 is axially slid down over tube envelope 70, the radially inwardly extending pins 68 become uniformly angularly reoriented upwardly while still remaining in their original vertical radial planes. Fastening clips 69, or any other suitable fasteners, are affixed with screws 71 to anchor dissipator 65 to the chassis 52. Because of the yieldability and resiliency of the angularly disposed pins 68, the dissipator 65 performs the double function of being a shock mount or impact cushion to protect the envelope and tube as well as being a heat disipator.

FIG. 13 shows a heat disipator 80 much like heat dissipator 45 except that the narrow backing strip 81 is helically wound directly on forming mandrel 44 which has the same diameter as tube envelope 84. Thus, when dissipator 45 is frictionally mounted on tube 50, backing sheet 81 directly and entirely contacts tube envelope 84 and pins 86 are radially disposed outwardly. In this embodiment, the heat from tube 50 is dissipated from backing sheet 81 along pins 86 and into the surrounding air.

In FIG. 12 a flat heat dissipator 72 is shown for use with two transistors 75 and 76. Dissipator 72 includes an integral margin or band 73 along one side thereof having a row of perforations 74 therealong for use in anchoring the dissipator in upstanding position on an underlying chassis. Clips 69 and screws 71 are employed with alternate clips being opposed to each other. The transistors 75 and 76 are affixed to backing sheet 77 of the dissipator by any convenient heat conductive manner such as soldering or with metal fasteners. In this embodiment, the heat from the transistors is dissipated from backing sheet 77 along pins 88 and into the surrounding air.

It should be noted that each of the backing sheets 21 of the various embodiments just described is free from perforations in the area in which the pins are bonded. Each metal backing sheet therefore retains its deformability without tending to fracture. Also the entire face of the metal sheet opposite the pin carrying face is perfectly smooth and regular and is therefore entirely available for the conducting of heat from the heat source or the dissipation of heat into the surrounding atmosphere.

Figure 15:
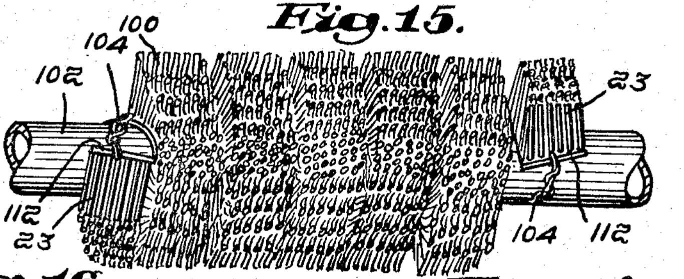
FIG. 15 is a perspective view of the heat dissipator of FIG. 14 wrapped around and secured to the piping in a more compact manner.

Turning now to a modified form of this invention, a heat dissipator 100 is illustrated in FIGS. 14 and 15. Heat dissipator 100 is primarily intended for use with hot water or steam piping 102 to convert the bare piping into an effective heat radiator. This embodiment somewhat resembles that of FIG. 13 in that it is formed with an elongated narrow strip backing assembly 112 and is helically wrapped around the heat source. However, dissipator 100 is bonded to the heat source and the materials and method of construction are somewhat different. Although the preferred use of dissipator 100 is as a piping radiator, it can also be used as a dissipator on flat or other non-cylindrical heat sources.

Figure 19:
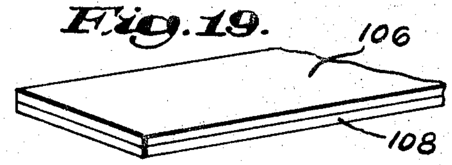
FIGS. 19–21 are perspective views showing a method of making the heat dissipator of FIG. 14.

Looking now to the method of construction of heat dissipator 100, FIG. 19 shows the first step of placing a flexible support strip 106, such as absorbent paper or fabric, over a flexible, heat-shrinkable, liquid impeding film strip 108, such as polyester film. The two strips are placed in face to face contact.

Figures 20, 21:
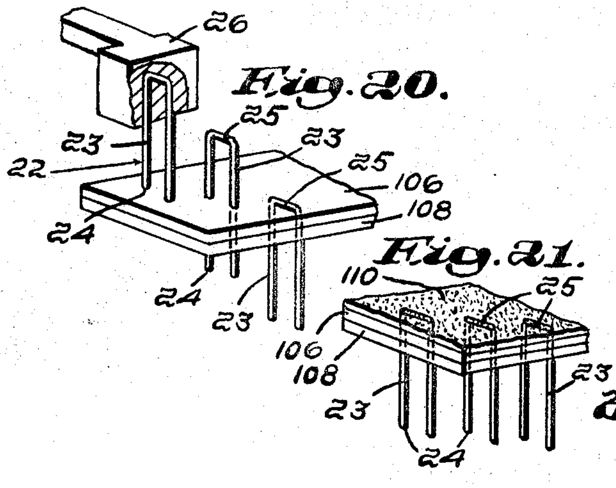

The second step of this method is shown in FIG. 20. A forming apparatus 26, similar to that illustrated in FIG. 1, forms a U-shaped (or optionally T-shaped) wire element 22 having a base 25, at least one pin body 23 and at least one pin tip 24. The U-shaped element 22 is preferred because of its ease of formation. The forming apparatus 26 drives the pin tips 24 in a normal direction through first the support strip 106 and then through the film strip 108 until the pin base 25 is flush against the upper free surface of support strip 106 as shown sequentially in FIG. 20. Preferably, the inserting operation creates a uniform pattern of wire elements 22 disposed throughout the support strip 106-film strip 108 assembly. It has been found that when paper having a thickness of .020 inch and film having a thickness of .002 inch is used for strips 106 and 108, respectively, there is sufficient assembly body to hold copper or aluminum wire elements 22 having a .032 inch diameter in a stable normally protruding position at this stage of manufacture.

The third step of this method is shown in FIG. 21. After all of the pin bases 25 have been inserted flush against support strip 106, a layer of curable, heat conductive, thermosetting, bonding agent 110 is applied over the exposed face of support strip 106, as by brushing. The bonding agent 110 is an adhesive substance which preferably has substantial pre-cure flexibility and shelf life. It has been found that epoxy resin loaded with aluminum powder is a satisfactory bonding agent because it has high bonding strength, efficiently conducts heat, is thermosetting (once cured, its grip remains strong despite thermal cycling), and has a desirable viscosity permitting easy brush application over strip 106 without subsequent dripping. A sufficient amount of bonding agent 110 is applied to cover pin bases 25. The uncured bonding agent adheres to support strip 106 and is prevented from penetrating strip 106 or running down pin bodies 23 by liquid-impeding film strip 108.

Figure 16:
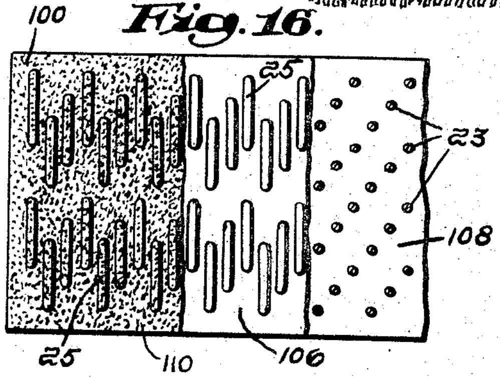
FIG. 16 is a bottom plan view, partly cut away, of the heat dissipator of FIG. 14.
Figure 17:
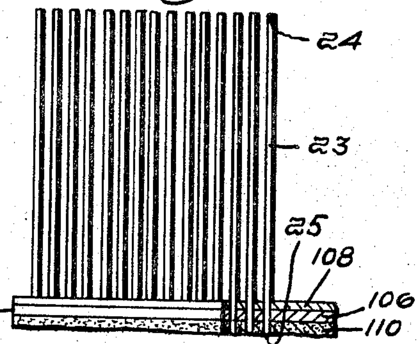
FIG. 17 is a side elevation, partly cut away, of the heat dissipator of FIG. 14.
Figure 18:
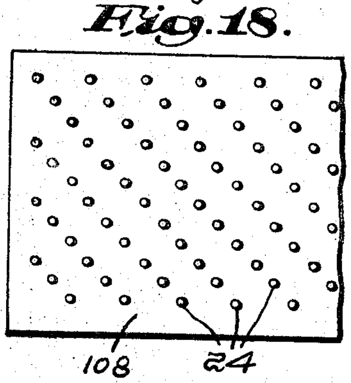
FIG. 18 is a top plan view of the heat dissipator of FIG. 14.

FIGS. 16–18 show bottom, side and top views of heat dissipator 100 made in accordance with the method of FIGS. 19–21. FIG. 16 shows the patterned disposition of pin bases 25 flush against support strip 106 with pin bodies 23 passing through support strip 106 and film strip 108. Bonding agent 110 covers support strip 106 including pin bases 25.

FIG. 17 shows wire pin bodies 23 held upright in the backing assembly 112 consisting of film strip 108, support strip 106, and bonding agent layer 110. It should be noted that when the pin body length exceeds approximately one inch, it may be advisable to employ additional sheets of support strip 106 and/or film strip 108 in sandwich fashion.

FIG. 18 illustrates one possible pattern of pin tips 24 disposed across the heat dissipator. The chief pattern requirement is that a sufficient, and preferably equal, amount of air space surround each pin body 23.

Heat dissipator 100 is shown in FIG. 14 wrapped around a length of hot water or steam piping 102. The method by which this is accomplished to create an effective heat radiator is to first clean the piping length to remove loose scale, paint or foreign matter from the area to be covered by the dissipator. Then, one end of the dissipator is secured to the piping by means of a thin tie wire 104 which is attached to the dissipator backing assembly 112. The tie wire 104 is simply wrapped once around and twisted back on itself. The narrow dissipator 100 is then helically or spirally wrapped around the piping 102 preferably at the spacing shown in FIG. 14. Alternatively, the spacing shown in FIG. 15 can be employed if more heat radiation is desired. After the requisite piping area is covered, a second tie wire 104 at the other end of backing assembly 112 is similarly secured.

The heat dissipator is then permanently bonded to piping 102 by the application of heat to cure bonding agent 110. Where the heat dissipator is applied to conventional home hot water or steam piping having an average line operating temperature of 160° F., the cure will take about 72 hours. This can be speeded up appreciably by use of an auxiliary heat source, such as a torch, and/or the application of pressure. For example, heating the dissipator to a temperature of 220° F. will accomplish curing in one hour. Subsequent thermal cycling of the piping 102 will not cause the bond between the dissipator and piping to deteriorate. This is because of the thermosetting nature of bonding agent 110.

The application of heat to the backing assembly 112 also causes film strip 108 to shrink. This shrinking action exerts considerable pressure uniformly on the bonding agent layer 110. This prevents air pockets from forming in the bond and also reduces the curing time required. The resultant bond strength and heat dissipation capacity are significantly increased by the heat shrink action of film strip 108. Furthermore, the heat shrink action more firmly locks pin bodies 23 in position.

When bonding agent 110 is heated for curing purposes, it becomes more viscous and because of the pressure exerted by the shrinking film strip 108, tends to only thinly cover pin bases 25 or leave them altogether uncovered, i.e. in direct metal to metal contact with piping 102. Naturally, such metal to metal contact produces good heat conductivity provided no adjacent insulating air spaces are present. The use in this invention of a bonding agent which is highly loaded with metal powder ensures that no air spaces occur and also ensures that it makes no significant difference whether or not pin bases 25 directly contact the heat source or are linked thereto by the heat conductive bonding agent.

The heat dissipator, as shown in FIGS. 14 and 15, will efficiently conduct the heat from piping 102 through bonding agent 110, along pin bodies 23 and into the surrounding air to heat the room. This heat dissipator has particular usefulness to the homeowner who can utilize it to convert lengths of hot water or steam piping to efficient radiators without disturbing the piping installation. Of course, dissipator 100 can also be used in any other situation where it is desirable to increase the heat transfer rate of tubing or piping or even on flat surfaces where it is desired to bond the dissipator to the heat source.

Whereas the invention has been described by reference to several preferred embodiments, it will be understood that numerous changes and modifications may be made therein without departing from the scope and spirit of the invention.

I claim:

1. A heat dissipator comprising:
(a) a flexible support strip;
(b) a flexible, heat-shrinkable, liquid-impeding film strip disposed in facing, abutting relation to the support strip at one major surface of each strip;
(c) a plurality of U-shaped, metal, heat-conductive elements penetrating in a normal direction and supported by the support strip-film strip assembly, the element bases seated flush against the non-abutting major surface of the support strip, the element tips extending beyond the non-abutting major surface of the film strip; and
(d) a layer of uncured curable, heat-conductive, thermosetting bonding agent applied over the entire non-abutting major surface of the support strip.

2. The heat dissipator of claim 1 wherein:
(a) said support strip is paper;
(b) said film strip is polyester film; and
(c) said bonding agent is epoxy resin loaded with metal powder.

3. The process for making a heat dissipator comprising the following steps:
(a) positioning a flexible support strip and a flexible, heat-shrinkable, liquid-impeding film strip in facing, abutting relation at one major surface of each strip;
(b) forming a metal wire into a plurality of heat-conductive elements each having a pin base and an integral pin body at right angles to each other;
(c) driving the wire elements into the support strip-film strip assembly in a direction normal to a major surface thereof, the free pin tips of the pin bodies passing first through the support strip and thence passing through and beyond the film strip, the pin bases seating flush against the free major surface of the support strip; and
(d) applying a layer of uncured, heat-conductive, curable, thermosetting bonding agent over the entire free major surface of the support strip.

4. The process of claim 3 further characterized by the following steps:
(e) fastening one end of the heat dissipator to a pipe;
(f) helically wrapping the heat dissipator around a selected length of the pipe;

(g) fastening the other end of the heat dissipator to the pipe; and (h) applying heat to the bonding agent to cure the bonding agent thereby creating a secure, heat conductive bond between the pipe and the heat dissipator.

5. The process of claim 4 further characterized by the following step:

(i) while applying heat to the bonding agent, simultaneously applying heat to the film strip to heat shrink the strip thereby exerting pressure against the bonding agent to increase the bond strength, reduce the curing time, and prevent the occurrence of air pockets in the bond.

References Cited

UNITED STATES PATENTS

| | | | |
|---|---|---|---|
| 1,977,731 | 10/1934 | Masury | 165—185 |
| 2,365,670 | 12/1944 | Wallace | 204—9 |
| 2,533,779 | 12/1950 | Emde | 174—35.5 |
| 2,678,808 | 5/1954 | Gier | 165—185 |
| 2,711,382 | 6/1955 | Smith-Johannsen | 165—185 X |
| 2,799,793 | 7/1957 | De Cain | 165—185 X |
| 2,935,549 | 5/1960 | Woods | 174—35.5 |

FOREIGN PATENTS

| | | |
|---|---|---|
| 159,624 | 4/1905 | Germany. |

MEYER PERLIN, *Primary Examiner.*

ROBERT A. O'LEARY, *Examiner.*

A. W. DAVIS, *Assistant Examiner.*